US011797109B2

(12) United States Patent
Matsumoto (10) Patent No.: US 11,797,109 B2
(45) Date of Patent: Oct. 24, 2023

(54) ELECTRONIC PEN AND HANDWRITING INPUT APPARATUS

(71) Applicant: Wacom Co., Ltd., Saitama (JP)

(72) Inventor: Yoshiharu Matsumoto, Saitama (JP)

(73) Assignee: Wacom Co., Ltd., Saitama (JP)

( * ) Notice: Subject to any disclaimer, the term of this patent is extended or adjusted under 35 U.S.C. 154(b) by 2 days.

(21) Appl. No.: 17/575,446

(22) Filed: Jan. 13, 2022

(65) Prior Publication Data

US 2022/0137731 A1    May 5, 2022

Related U.S. Application Data

(63) Continuation of application No. PCT/JP2020/016491, filed on Apr. 15, 2020.

(30) Foreign Application Priority Data

Jul. 19, 2019   (JP) ................. 2019-133713

(51) Int. Cl.
  *G06F 3/0354*   (2013.01)
  *G06F 3/044*   (2006.01)
  (Continued)

(52) U.S. Cl.
  CPC ........ *G06F 3/03545* (2013.01); *G06F 3/0383* (2013.01); *G06F 3/0441* (2019.05); *G06F 3/0442* (2019.05); *G06F 3/04162* (2019.05)

(58) Field of Classification Search
  CPC .. G06F 3/03545; G06F 3/0383; G06F 3/0442; G06F 3/04162; G02F 1/167;
  (Continued)

(56) References Cited

U.S. PATENT DOCUMENTS

| 10,037,089 | B2 * | 7/2018 | Bishop | ................ G06F 3/03545 |
| 2013/0009907 | A1 * | 1/2013 | Rosenberg | .............. G06F 3/046 345/174 |

(Continued)

FOREIGN PATENT DOCUMENTS

| JP | 08-271659 A | 10/1996 |
| JP | 08-335132 A | 12/1996 |

(Continued)

OTHER PUBLICATIONS

International Search Report, dated Jul. 14, 2020, for International Application No. PCT/JP2020/016491, 3 pages.

*Primary Examiner* — Koosha Sharifi-Tafreshi
(74) *Attorney, Agent, or Firm* — Seed IP Law Group LLP (57) ABSTRACT

Disclosed is an electronic pen including a casing having openings, a coil, a magnetic core having the coil wound therearound, and having a through hole extending in an axial direction of the electronic pen, a capacitor that forms a resonant circuit together with the coil, and a core body inserted through the through hole of the magnetic core. The electronic pen exchanges a signal having a frequency corresponding to a resonance frequency of the resonant circuit with a position detection sensor through electromagnetic inductive coupling. The core body includes a pen point portion and a tail portion forming magnetic poles on opposite sides, the pen point portion protruding outwardly from one of the openings of the casing of the electronic pen and being located away from an end of the magnetic core on a pen-point side in the axial direction of the electronic pen.

12 Claims, 6 Drawing Sheets

(51) Int. Cl.
  *G06F 3/041* (2006.01)
  *G06F 3/038* (2013.01)

(58) Field of Classification Search
  CPC ....... G02F 1/1673; G02F 1/166; G09G 3/344; G09G 3/3453
  USPC ................... 345/179, 107; 178/19.01, 19.03; 359/296
  See application file for complete search history.

(56) References Cited

U.S. PATENT DOCUMENTS

| | | | | |
|---|---|---|---|---|
| 2016/0062490 A1* | 3/2016 | Ogata | ..................... | G06F 3/038 345/179 |
| 2016/0162049 A1* | 6/2016 | Horie | .................. | G06F 3/03545 29/605 |
| 2016/0202507 A1* | 7/2016 | Ebisui | ..................... | G09F 9/372 427/64 |
| 2017/0097724 A1* | 4/2017 | Kobori | ..................... | G06F 3/046 |
| 2017/0357340 A1* | 12/2017 | Kamiyama | .............. | G06F 3/046 |
| 2018/0011560 A1* | 1/2018 | Kamiyama | ............ | G06F 3/0383 |
| 2018/0246598 A1* | 8/2018 | Sainis | ................... | G02F 1/1685 |

FOREIGN PATENT DOCUMENTS

| | | |
|---|---|---|
| JP | 3040066 U | 5/1997 |
| JP | 2003-335094 A | 11/2003 |
| JP | 2007-206845 A | 8/2007 |
| JP | 2007-206846 A | 8/2007 |
| JP | 4089808 B2 | 5/2008 |
| JP | 2008-155551 A | 7/2008 |
| JP | 2008-281920 A | 11/2008 |
| JP | 2011-186803 A | 9/2011 |
| JP | 2013-161307 A | 8/2013 |
| JP | 2018-037033 A | 3/2018 |

\* cited by examiner

FIG.5A
<WITHOUT CORE BODY>

FIG.5B
<WITH CORE BODY ATTACHED>

ELECTRONIC PEN AND HANDWRITING INPUT APPARATUS

BACKGROUND

Technical Field

This disclosure relates to a handwriting input apparatus and an electronic pen for use in the handwriting input apparatus.

Background Art

With an increasing demand for reduced use of paper, using an electronic pen to make a handwriting input on an input device, such as a tablet terminal, having a position detection device including a position detection sensor for detecting a position indicated by the electronic pen, thereby causing handwriting information as to the handwriting input to be stored as electronic data, instead of using a writing implement, such as a ballpoint pen or a pencil, to make a handwriting input on paper, has become increasingly common.

In this case, there is a demand to make the handwriting information inputted using the electronic pen visually recognizable for a user. Accordingly, the tablet terminal may be provided with a display control circuit and a display panel disposed so as to overlap with the position detection sensor, and the display control circuit may be configured to perform control such that a display image (of a writing mark or the like) corresponding to coordinate data as to the position indicated by the electronic pen and detected in the position detection device will be displayed on the display panel for recognition.

In this case, a liquid crystal display (LCD) or an organic electroluminescent (EL) display may be used as the display panel, or alternatively, electronic paper, such as electrophoretic display panels described in JP 2007-206845A and JP 2007-206846A, for example, may be used as the display panel.

However, the tablet terminal as described above has a problem in that the need of the display control circuit and the display panel for displaying the handwriting information on the basis of coordinate information as to the position indicated by the electronic pen and detected in the position detection device leads to an increased cost.

Meanwhile, JP 2018-37033A, for example, proposes a handwriting input apparatus including: a board device that includes a plate-shaped board in which a position detection device including a position detection sensor is housed, and a clip member capable of fastening paper onto the board such that the paper overlaps with the position detection sensor; and an electronic pen having a writing implement function, such as a ballpoint pen function, and capable of interacting with the position detection sensor to exchange signals therewith.

In this handwriting input apparatus, if a handwriting input is made on the paper using the writing implement function of the electronic pen, coordinate information as to a writing mark of the handwriting input is detected in the position detection device through the position detection sensor, and the detected coordinate information is, for example, outputted to a personal computer or the like, or stored in an internal memory to be used.

According to this handwriting input apparatus, the writing mark of the handwriting input made using the writing implement function of the electronic pen is drawn on the paper, eliminating the need for a display panel for displaying handwriting information for recognition as described above, and this leads to a reduced cost and increased convenience.

However, the handwriting input apparatus described in JP 2018-37033A involves the need for the electronic pen to have the function of a writing implement, such as the ballpoint pen function, and this leads to a complicated configuration and an increased cost of the electronic pen. In addition, although this handwriting input apparatus is convenient in an application in which paper on which a writing mark has been formed by a handwriting input is kept, the handwriting input apparatus has a problem with an application in which it is not necessary to keep the paper, because it is not easy to physically erase the writing mark written on the paper using the ballpoint pen function or the like, and this requires cumbersome replacement of paper when necessary. Moreover, even if the writing mark on the paper can be erased using an eraser, eraser dust is produced, which is a disadvantage.

BRIEF SUMMARY

It is desirable to provide an electronic pen and a handwriting input apparatus that are able to solve the problems as described above.

According to an embodiment of this disclosure, there is provided an electronic pen including: a casing having a plurality of openings; a coil; a magnetic core having the coil wound therearound, and having a through hole extending in an axial direction of the electronic pen; a capacitor that forms a resonant circuit together with the coil; and a core body inserted through the through hole of the magnetic core. The electronic pen, in operation, exchanges a signal having a frequency corresponding to a resonance frequency of the resonant circuit with a position detection sensor through electromagnetic inductive coupling. The core body includes a pen point portion and a tail portion forming magnetic poles on opposite sides of the core body, and the pen point portion protrudes outwardly from one of the openings of the casing of the electronic pen and is located away from an end portion of the magnetic core on a side of the electronic pen that includes the pen point portion in the axial direction of the electronic pen.

According to another embodiment of this disclosure, there is provided a handwriting input apparatus including: a position detection device having a position detection sensor of an electromagnetic induction type disposed under a magnetic sheet that changes a color at a position at which a magnetic pole is in proximity to or in contact with the magnetic sheet so as to overlap with the magnetic sheet; and an electronic pen. The electronic pen includes: a casing having a plurality of openings; a coil; a magnetic core having the coil wound therearound, and having a through hole extending in an axial direction of the electronic pen; a capacitor that forms a resonant circuit together with the coil; and a core body inserted through the through hole of the magnetic core. The core body includes a pen point portion and a tail portion forming magnetic poles on opposite sides of the core body, and the pen point portion protrudes outwardly from one of the openings of the casing of the electronic pen and is located away from an end portion of the magnetic core on a side of the electronic pen that includes the pen point portion in the axial direction of the electronic pen. The position detection sensor of the position detection device, in operation, exchanges a signal having a frequency corresponding to a resonance frequency of the resonant circuit with the resonant circuit of the electronic pen through electromagnetic inductive coupling.

The electronic pen having the above-described configuration is an electronic pen of the electromagnetic induction type including the resonant circuit formed by the coil and the capacitor, and is configured such that the core body inserted through the through hole of the magnetic core having the coil wound therearound has the magnetic poles at the pen point portion and the tail portion at both ends thereof in the axial direction. That is, the electronic pen having the above-described configuration can be formed by only providing magnetic poles at both ends of a core body of an electronic pen of the electromagnetic induction type, without the need for a special element such as a writing implement function as described in JP 2018-37033A.

In addition, the handwriting input apparatus includes the electronic pen having the above-described configuration, and the position detection device having the position detection sensor of the electromagnetic induction type disposed under the magnetic sheet that changes a color at a position at which a magnetic pole is in proximity to or in contact with the magnetic sheet so as to overlap with the magnetic sheet.

In the handwriting input apparatus having the above-described configuration, a locus of movement of the pen point portion of the core body of the electronic pen appears as a writing mark on a front surface of the magnetic sheet when the pen point portion of the core body of the electronic pen is in proximity to or in contact with the magnetic sheet, because the color at the position on the magnetic sheet at which the pen point portion of the core body of the electronic pen is in proximity to or in contact with the magnetic sheet changes due to the magnetic pole at the pen point portion of the core body.

At the same time, signals are exchanged between the resonant circuit of the electronic pen and the position detection sensor through electromagnetic inductive coupling, and the locus of the movement of the pen point portion of the core body of the electronic pen is thereby detected as coordinate data as to the writing mark in the position detection device. That is, the locus of the movement of the pen point portion of the core body of the electronic pen on the front surface of the magnetic sheet is expressed by a change in color on the front surface of the magnetic sheet, while coordinate data as to the locus of the movement thereof is detected in the position detection device.

Due to the use of the magnetic sheet that changes the color at the position at which a magnetic pole is in proximity to or in contact with the magnetic sheet, the handwriting input apparatus having the above-described configuration eliminates the need to use paper as used in the handwriting input apparatus described in JP 2018-37033A. Note that a dedicated eraser is prepared for this type of magnetic sheet, and the position at which the color has been changed by the proximity or contact of the magnetic pole can be easily erased by being returned to an original color using the eraser.

DETAILED DESCRIPTION

[External Appearance and Basic Configuration of Handwriting Input Apparatus]

Figure 1:
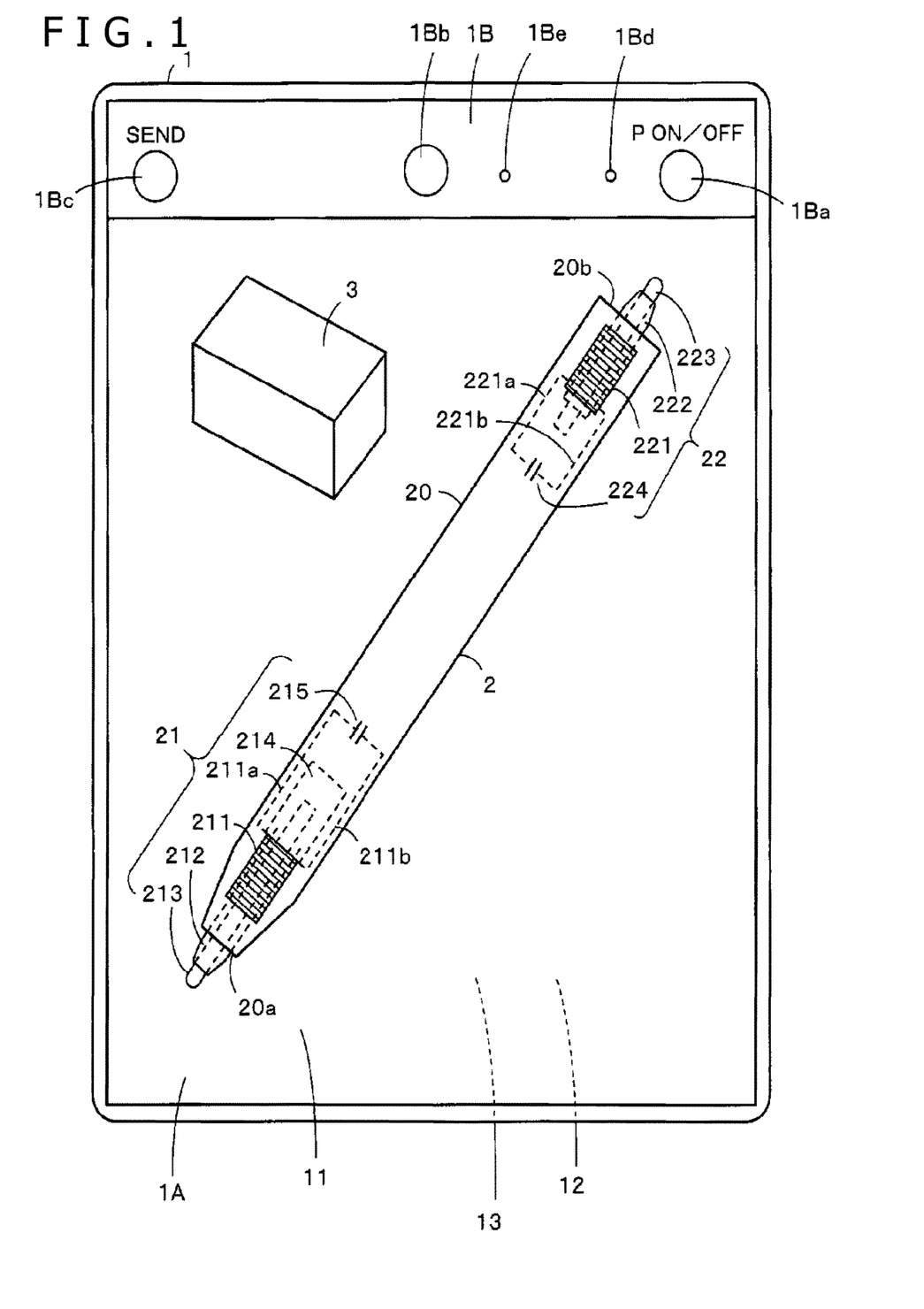
FIG. 1 is a diagram illustrating an external appearance of a tablet terminal that forms a part of a handwriting input apparatus according to an embodiment of this disclosure.

FIG. 1 is a diagram for explaining an external appearance of a handwriting input apparatus according to an embodiment of this disclosure. The handwriting input apparatus according to this embodiment includes a tablet terminal 1 and an electronic pen 2.

Configuration Example of Tablet Terminal 1

The tablet terminal 1 according to this embodiment has a slim and rectangular plate-shaped body having a thickness of, for example, several millimeters, and the plate-shaped body has a flat surface defined as a front surface on one side. Most of the front surface forms a handwriting input area (indication input area) for the electronic pen 2. Then, a front surface of the handwriting input area forms a handwriting input surface (indication input surface) 1A. FIG. 1 is a diagram illustrating the handwriting input surface 1A of the tablet terminal 1 as viewed from above in a direction perpendicular to the handwriting input surface 1A.

In this embodiment, an operation panel 1B is provided in an area on the upper side of the handwriting input area on the front surface of the tablet terminal 1. The operation panel 1B has disposed therein operation buttons, such as a power button 1Ba, a writing input end button 1Bb, and an information transmission button 1Bc, and indicators, such as a power indicator 1Bd and a communication indicator 1Be. Each of the indicators 1Bd and 1Be is formed by, for example, a light emitting diode (LED).

The tablet terminal 1 according to this embodiment is provided with a rechargeable battery, which is not illustrated, and when the power button 1Ba has been turned on, a drive voltage is supplied from the battery to circuit components as necessary. Meanwhile, the writing input end button 1Bb is pressed when a user causes handwriting input data generated on a page-by-page basis to be stored in a storage device as described below. In addition, the tablet terminal 1 according to this embodiment is provided with a wireless communication circuit as described below, and when the information transmission button 1Bc has been pressed, the stored handwriting input data generated on a page-by-page basis is transmitted to a server apparatus formed by an external computer.

The power indicator 1Bd is used to inform the user whether power is on or off. The communication indicator 1Be is used to inform the user whether the handwriting input data is being transmitted from the tablet terminal 1.

Figure 2:
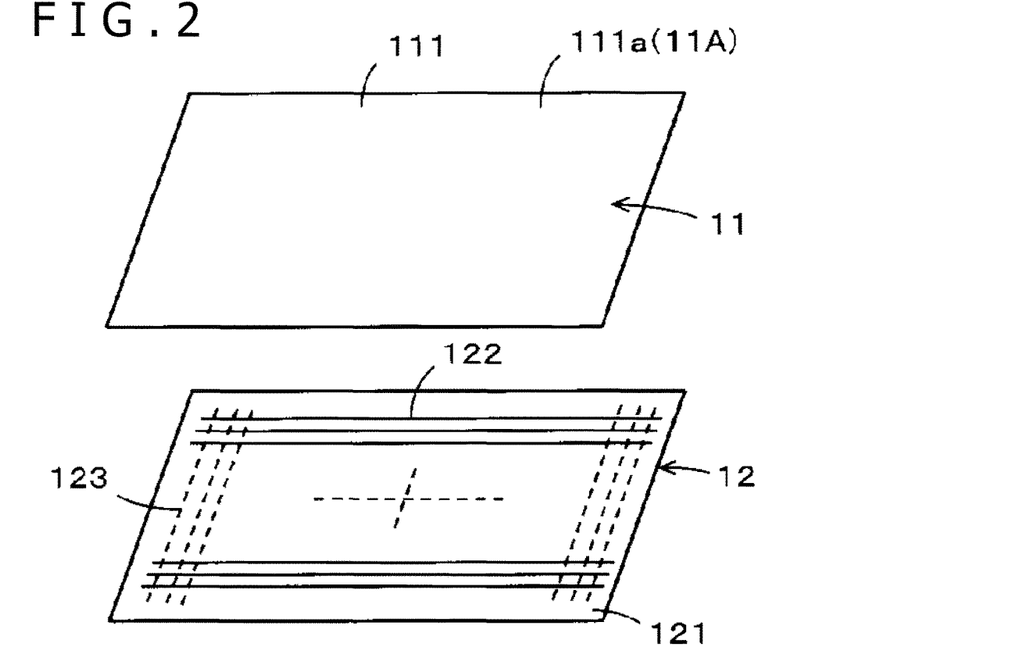
FIG. 2 is a diagram illustrating a configuration example of portions of the handwriting input apparatus according to an embodiment of this disclosure.
Figures 3A, 3B:
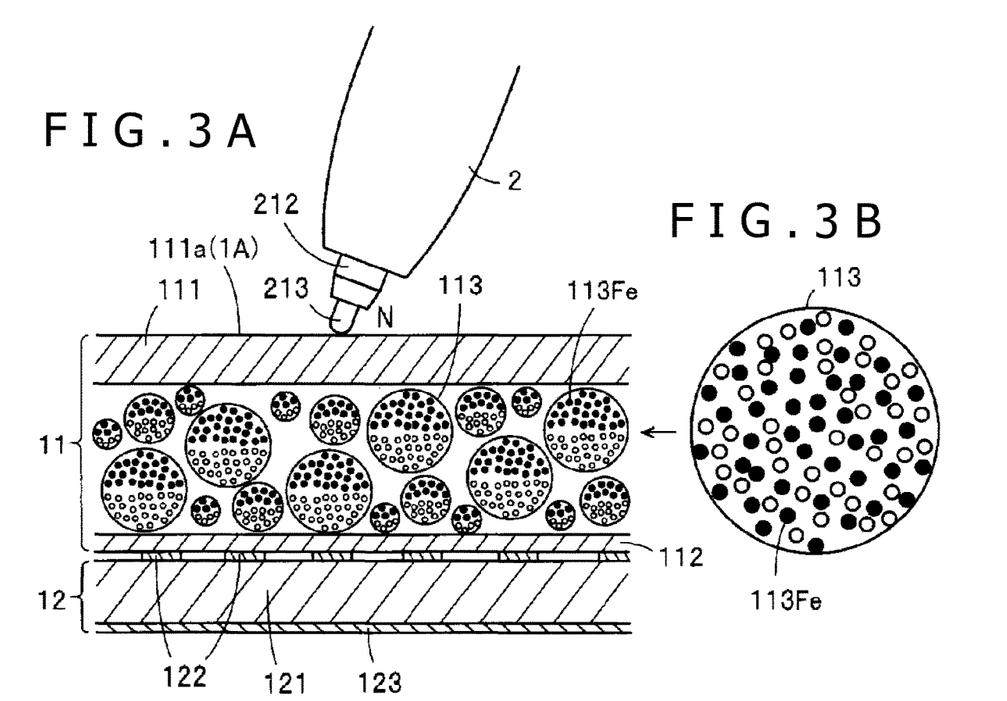
FIGS. 3A and 3B are diagrams for explaining configuration examples of portions of the handwriting input apparatus according to an embodiment of this disclosure.

As illustrated in FIGS. 2, 3A, and 3B, in the handwriting input area of the tablet terminal 1, a magnetic sheet 11 is disposed, and under the magnetic sheet 11, a position detection sensor 12 is disposed so as to overlap with the magnetic sheet 11 when viewed in a direction perpendicular to the front surface of the tablet terminal 1.

As illustrated in FIG. 3A, the magnetic sheet 11 includes a sheet-shaped resin base 112 and a sheet-shaped resin base 111 made of, for example, polyethylene terephthalate (PET), and further includes a large number of microcapsules 113 in which particles of a magnetic material, e.g., iron particles 113Fe (represented by black dots in FIGS. 3A and 3B), are migratably enclosed. The microcapsules 113 are enclosed in a gap between the sheet-shaped resin bases 111 and 112. In this case, at least the sheet-shaped resin base 111 is made of a transparent material. A magnetic sheet used in Clean note Kaite, produced by PLUS Corporation, for example, can be used as the magnetic sheet 11.

In this embodiment, a front surface 111a of the sheet-shaped resin base 111 of the magnetic sheet 11 forms the handwriting input surface 1A as illustrated in FIGS. 2 and 3A.

When no magnetic pole has been in proximity to or in contact with the magnetic sheet 11, the iron particles 113Fe in each microcapsule 113 of the magnetic sheet 11 are at irregular, freely-selected positions as illustrated in FIG. 3B, making a front surface of the magnetic sheet 11, i.e., the handwriting input surface 1A, entirely colored in a predetermined original color, e.g., white.

Then, when a magnetic pole is in proximity to or in contact with the front surface 111a of the sheet-shaped resin base 111 of the magnetic sheet 11, the iron particles 113Fe inside the microcapsules 113 that are in the vicinity of the position at which the magnetic pole is in proximity thereto or in contact therewith are attracted toward the magnetic pole as illustrated in FIG. 3A. As a result, the front surface of the magnetic sheet 11, i.e., the handwriting input surface 1A, assumes the color of the iron particles 113Fe, e.g., black, at the position at which the magnetic pole is in proximity thereto or in contact therewith. The iron particles 113Fe inside the microcapsules 113 keep the positions thereof even if the magnetic pole is moved away. Therefore, if the magnetic pole is moved while being in proximity to or in contact with the front surface of the magnetic sheet 11, a locus of the movement thereof appears as a black line on the front surface of the magnetic sheet 11.

The handwriting input apparatus according to this embodiment is accompanied by an eraser 3, which is used to bring the iron particles 113Fe inside the microcapsules 113 which have been magnetically attracted toward the front surface of the magnetic sheet 11 of the tablet terminal 1 back into the state of irregular positions as illustrated in FIG. 3B. The eraser 3 is provided with an eraser-use magnet as is well known, and can be used to erase a whole area of a predetermined size, and a corner portion of the eraser 3 can be used to finely erase a portion of a writing mark.

The position detection sensor 12 is disposed on the rear side of the magnetic sheet 11 so as to overlap with the magnetic sheet 11. Then, in the tablet terminal 1, a position detection device 13 including a position detection circuit as described below and other electronic components is disposed using a space on the rear side of the position detection sensor 12 and a space on the rear side of the operation panel 1B. In this embodiment, the position detection sensor 12 forms a portion of the position detection device 13.

The position detection device 13 according to this embodiment is of an electromagnetic induction type, and the position detection sensor 12 and the electronic pen 2 interact with each other through electromagnetic inductive coupling to exchange signals as described below. Then, on the basis of the interaction of signals between the position detection sensor 12 and the electronic pen 2, the position detection device 13 detects a coordinate position indicated by the electronic pen 2 on the handwriting input surface 1A.

As illustrated in FIG. 3A, in this embodiment, the position detection sensor 12 includes a flexible sheet 121 made of an insulating material, and electrode conductors disposed thereon to form a plurality of loop coils. In this embodiment, on the flexible sheet 121, a plurality of x-axis direction loop coils are disposed with a predetermined pitch in a horizontal direction (i.e., an x-axis direction) of the handwriting input surface 1A, and a plurality of y-axis direction loop coils are disposed with a predetermined pitch in a vertical direction (i.e., a y-axis direction) thereof.

In this embodiment, to prevent unwanted overlap of the electrode conductors forming the x-axis direction loop coils and the y-axis direction loop coils arranged in directions perpendicular to each other, electrode conductors 122 and 123 are formed on a front surface and a rear surface of the flexible sheet 121 as illustrated in FIG. 3A, and through holes (not illustrated) that pass through the flexible sheet 121 are used to form the x-axis direction loop coils and the y-axis direction loop coils on the flexible sheet 121. Note that, for the sake of convenience, the electrode conductors 122 and 123 are represented as straight conductors in FIG. 2, but in actuality, loop coils are formed on the flexible sheet 121 of the position detection sensor 12 (see FIG. 7, which will be described below).

Configuration Example of Electronic Pen 2

As described above, in this embodiment, the electronic pen 2 is configured to exchange signals with the position detection sensor 12 of the position detection device 13 of the tablet terminal 1 employing an electromagnetic induction method, thereby causing the position detection device 13 of the tablet terminal 1 to detect the position indicated by the electronic pen 2. The mechanical configuration of the electronic pen 2 according to this embodiment may be similar to the configuration of a known electronic pen of the electromagnetic induction type except that a core body of the electronic pen 2 is formed by a magnet (in this example, a permanent magnet). Accordingly, the configurations of only some portions of the electronic pen 2 will be described here, while descriptions of the configurations of other portions thereof will be omitted.

As illustrated in FIG. 1, the electronic pen 2 according to this embodiment includes a tubular casing 20 made of, for example, a resin, and having a hollow portion, an electronic pen body circuit 21 disposed at an opening 20a of the hollow portion on one side in an axial direction, and an eraser function circuit 22 disposed at an opening 20b of the hollow portion on an opposite side in the axial direction.

The electronic pen body circuit 21 includes a coil 211, a magnetic core, e.g., a ferrite core 212 in this example, around which the coil 211 is wound, a core body 213 formed by a magnet, a pen pressure detection circuit 214, and a capacitor 215 that forms a resonant circuit together with the coil 211.

Meanwhile, the eraser function circuit 22 includes a coil 221, a magnetic core, e.g., a ferrite core 222 in this example, around which the coil 221 is wound, a core body 223 formed by a magnet, and a capacitor 224 that forms a resonant circuit together with the coil 221.

Figure 4A:
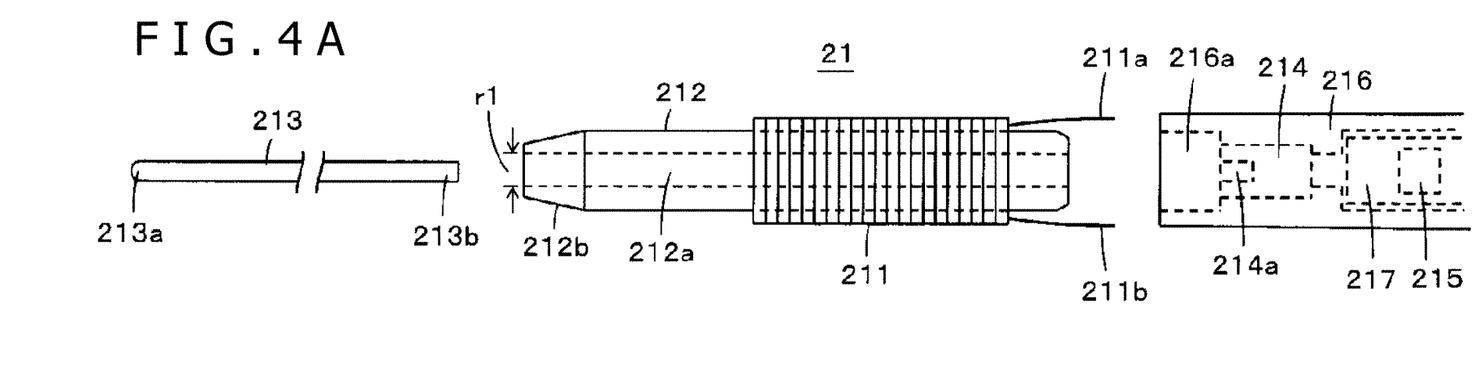
FIGS. 4A and 4B are diagrams for explaining configuration examples of portions of an electronic pen that forms a part of the handwriting input apparatus according to an embodiment of this disclosure.
Figure 4B:
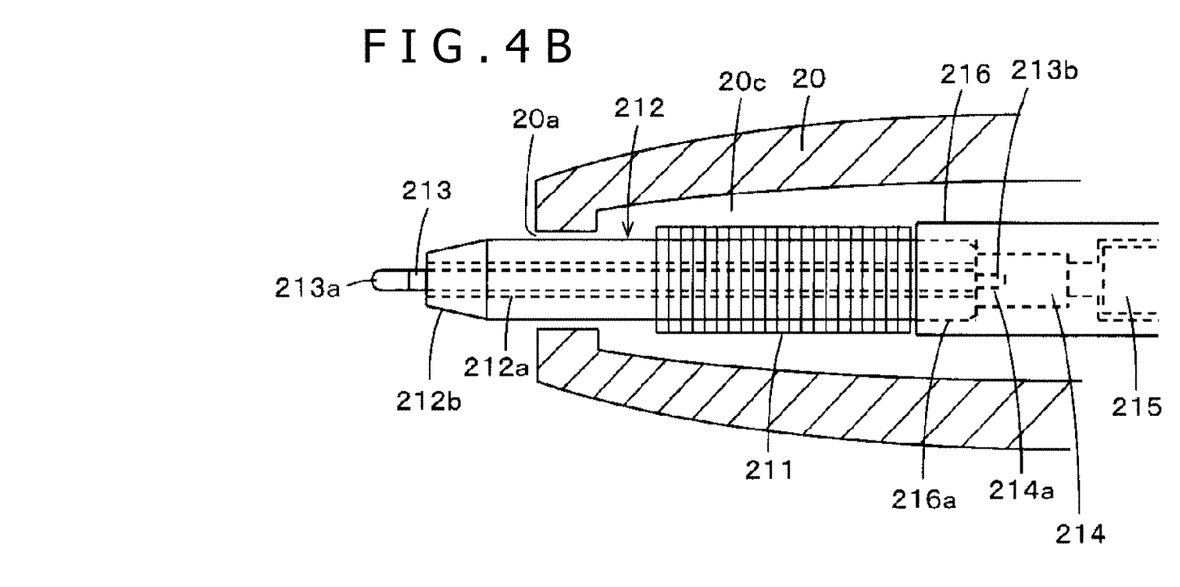

FIGS. 4A and 4B are diagrams for explaining configuration examples of the electronic pen body circuit 21. As illustrated in FIG. 4A, in the electronic pen body circuit 21 according to this embodiment, an end portion of the ferrite core 212, having the coil 211 wound therearound, on a side opposite to a pen-point side is coupled to a tubular body portion 216 made of, for example, a resin.

As illustrated in FIG. 4A, the ferrite core 212 in this example is formed by a ferrite material in the shape of, for example, a round column, and having formed therein a through hole 212a extending in the axial direction and having a predetermined diameter r1 (for example, r1=1 mm) through which the core body 213 is inserted. The ferrite core 212 has a tapered portion 212b that gradually tapers formed at an end portion thereof on the pen-point side, and the tapered portion 212b serves to strengthen magnetic coupling with the position detection sensor 12 of the position detection device 13.

Then, in this embodiment, the pen pressure detection circuit 214 is disposed in the tubular body portion 216 in the vicinity of a position at which the ferrite core 212 is coupled to the tubular body portion 216. The pen pressure detection circuit 214 is configured to use a semiconductor element that varies capacitance according to pen pressure as described in JP 2013-161307A, for example. Note that the pen pressure detection circuit 214 may be configured to use a variable capacitor that varies in capacitance according to the pen pressure, employing pen pressure detection means having a well-known mechanism as described in JP 2011-186803A, for example.

A printed circuit board 217 is further contained in the tubular body portion 216. The capacitor 215, which forms the resonant circuit by being connected in parallel with the coil 211, is disposed on the printed circuit board 217. Then, the variable capacitor formed by the pen pressure detection circuit 214 is connected in parallel with the capacitor 215 formed on the printed circuit board 217 to form a portion of the resonant circuit.

Then, as illustrated in FIG. 4B, the end portion of the ferrite core 212 on the side opposite to the pen-point side is fitted into a recessed portion 216a defined in the tubular body portion 216, so that the ferrite core 212 is coupled to the tubular body portion 216. Although an illustration is omitted, when the ferrite core 212 is coupled to the tubular body portion 216, ends 211a and 211b of the coil 211 are electrically connected in parallel with the capacitor 215 disposed on the printed circuit board 217 in the tubular body portion 216.

In this embodiment, the core body 213 is formed by a bar-shaped magnet having a diameter smaller than the diameter r1 of the through hole 212a of the ferrite core 212, and, in this example, has a north pole at a pen point portion 213a and a south pole at an end portion (i.e., a tail portion) 213b on a side opposite to the pen point portion 213a in the axial direction. In addition, the core body 213 has an axial length greater than an axial length of the ferrite core 212.

In this embodiment, the core body 213 having the above-described configuration is inserted through the through hole 212a of the ferrite core 212 as illustrated in FIG. 4B, and the tail portion 213b is fitted to a fitting recessed portion 214a of the pen pressure detection circuit 214, thus being directly fitted to the pen pressure detection circuit 214. Then, when the core body 213 has been fitted to the pen pressure detection circuit 214, the pen point portion 213a of the core body 213 protrudes from an opening of the ferrite core 212 on the pen-point side. As a result, the magnetic pole at the pen point portion 213a of the core body 213 is located away from the end portion of the ferrite core 212 on the pen-point side.

Then, as illustrated in FIG. 4B, in this embodiment, the pen point portion 213a of the core body 213 is arranged to protrude outwardly from the opening 20a of the casing 20 of the electronic pen 2 together with a portion of the ferrite core 212 on the pen-point side. Thus, a pen pressure applied to the pen point portion 213a of the core body 213 is directly transmitted to the pen pressure detection circuit.

The electronic pen 2 according to this embodiment receives an alternating-current signal having a frequency f0 transmitted through the position detection sensor 12 of the position detection device 13 with the resonant circuit through electromagnetic inductive coupling. Then, the resonant circuit of the electronic pen 2 returns the received alternating-current signal to the position detection sensor 12 through electromagnetic inductive coupling. The position detection device 13 detects the position indicated by the electronic pen 2 by detecting the position, on the position detection sensor 12, of the alternating-current signal returned from the electronic pen 2. In addition, the position detection device 13 detects the pen pressure applied to the electronic pen 2 by detecting a change in phase or frequency of the alternating-current signal received from the electronic pen 2.

To enable the above-described interaction of the alternating-current signal between the electronic pen 2 and the position detection sensor 12 to be accomplished with high performance with a minimum energy loss, the resonant circuit of the electronic pen 2 is arranged to have a resonance frequency equal to the frequency f0 of the alternating-current signal transmitted from the position detection device 13.

Figure 5A:
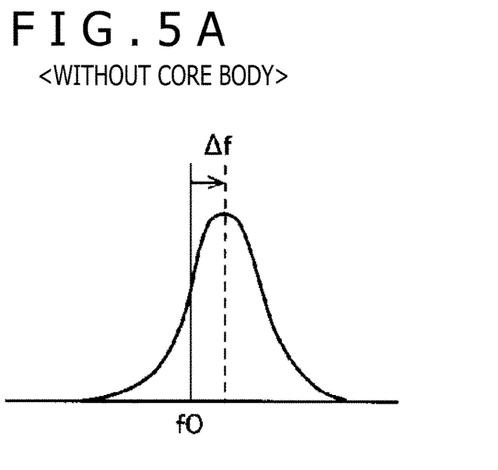
FIGS. 5A and 5B are diagrams for explaining configuration examples of portions of the electronic pen that forms a part of the handwriting input apparatus according to an embodiment of this disclosure.

However, in this embodiment, an influence of the magnet forming the core body 213 needs to be taken into consideration. Specifically, when the core body 213 formed by the magnet is inserted through the through hole 212a of the ferrite core 212, a magnetic characteristic of the ferrite core 212 undergoes a reduction, resulting in a reduced inductance value of the coil 211. Thus, even when the resonance frequency of the resonant circuit formed by the coil 211 and the capacitor 215 has been arranged to be equal to the frequency f0 of the alternating-current signal transmitted from the position detection device 13, an effective resonance frequency will be higher than the frequency f0 by a reduction, $\Delta f$, of the inductance of the coil 211 caused by the core body 213 formed by the magnet (see the graph of a resonance characteristic of the electronic pen 2 illustrated in FIG. 5A).

Figure 5B:
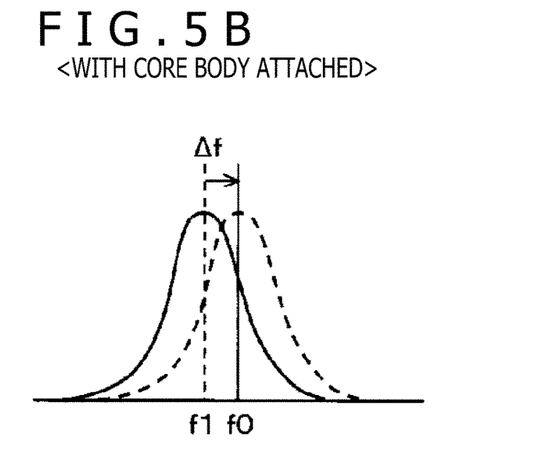

Accordingly, in the electronic pen 2 according to this embodiment, the resonance frequency of the resonant circuit formed by the coil 211 and the capacitor 215 is arranged to be a frequency f1 (<f0), which is lower than the frequency f0 of the alternating-current signal transmitted from the position detection device 13, with the reduction of the inductance of the coil 211 caused by the core body 213 formed by the magnet taken into account in advance (see the graph of a resonance characteristic illustrated in FIG. 5B). As a result, when the core body 213 has been inserted through the through hole 212a of the ferrite core 212, the effective resonance frequency of the resonant circuit formed by the coil 211 and the capacitor 215 will be equal to the frequency f0 as illustrated in FIG. 5B.

In addition, a sheet-shaped magnetic member, which is not illustrated in the figures, for external electromagnetic shielding is disposed on a surface of the position detection sensor 12 of the tablet terminal 1 according to this embodiment on a side opposite to a surface thereof which is opposed to the magnetic sheet 11.

When the electronic pen 2 is in proximity to or in contact with the handwriting input surface 1A of the tablet terminal 1, direct-current magnetic flux from the core body 213 formed by the magnet enters into the sheet-shaped magnetic member of the position detection sensor 12, resulting in a reduction of a magnetic characteristic of the sheet-shaped magnetic member, and this leads to reduced inductance values of loop coils of the position detection sensor 12. This may reduce magnetic coupling between the coil 211 of the electronic pen 2 and the loop coils of the position detection sensor 12, and may result in a reduced signal level of the signal exchanged between the electronic pen 2 and the position detection sensor 12.

Figure 6:
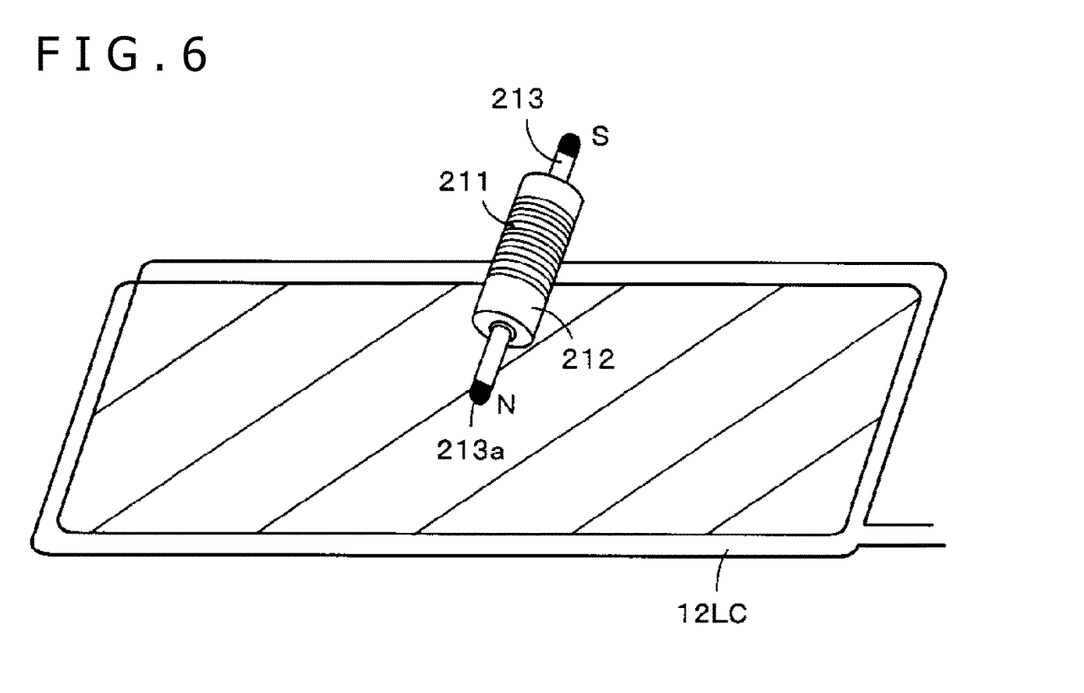
FIG. 6 is a diagram for explaining a configuration example of portions of the handwriting input apparatus according to an embodiment of this disclosure.

However, as illustrated in FIG. 6, a range of magnetic flux from the magnetic pole at the pen point portion 213a of the core body 213 formed by the magnet is exceedingly small compared to a range (i.e., a range hatched with oblique lines in FIG. 6) enclosed by a loop coil (a loop coil of two turns in the example of FIG. 6) 12LC formed in the position detection sensor 12, in which linked magnetic flux is detected, and there is a certain distance between the pen point portion 213a of the core body 213 of the electronic pen 2 and the sheet-shaped magnetic member of the position detection sensor 12, and therefore, accuracy of coordinate detection in the position detection device 13 is not significantly affected. That is, the magnetic flux from the pen point portion 213a of the core body 213 formed by the magnet hardly affects the magnetic coupling between the coil 211 of the electronic pen 2 and the position detection sensor 12, or magnetic characteristics of the coil 211 of the electronic pen 2, the position detection sensor 12, and the sheet-shaped magnetic member of the position detection sensor 12.

As described above, the handwriting input apparatus according to this embodiment allows the position detection device 13 to detect the coordinate position indicated by the electronic pen 2 as accurately as in related art, even when the core body 213 of the electronic pen 2 of the electromagnetic induction type is formed by the magnet.

The eraser function circuit 22 of the electronic pen 2 may have a configuration similar to that of the above-described electronic pen body circuit 21. That is, the core body 223, which is formed by a bar-shaped magnet, is inserted through a through hole of the ferrite core 222 around which the coil 221 is wound to form the eraser function circuit 22. In this case, the core body 223 has a south pole at a distal end thereof, and has a north pole on a side opposite to the distal end, and the magnetic poles of the core body 223 are reversed in polarity compared to those of the core body 213 of the electronic pen body circuit 21.

Accordingly, when a distal end portion of the core body 223 of the eraser function circuit 22 is moved so as to follow a writing mark appearing on the front surface of the magnetic sheet 11 while being in proximity thereto or in contact therewith, the iron particles 113Fe inside the microcapsules 113 which have been attracted by the north pole at the pen point portion 213a of the core body 213 of the electronic pen body circuit 21 to become magnetized as south poles are brought away from the front surface of the magnetic sheet 11 by the south pole at the distal end portion of the core body 223 of the eraser function circuit 22, so that the writing mark appearing on the front surface of the magnetic sheet 11 is erased.

The position detection device 13 of the handwriting input apparatus according to this embodiment is configured to transmit, in addition to the above-described alternating-current signal having the frequency f0 used for writing input detection, an alternating-current signal having a frequency f2≠f0≠f1) for erasure instruction detection to the electronic pen 2 through the position detection sensor 12. The frequency f2 is clearly distinguishable from the frequency f0, and enables a detection of a corresponding return signal.

Then, the coil 221 of the eraser function circuit 22 of the electronic pen 2 is connected in parallel with the capacitor 224 to form the resonant circuit. This resonant circuit is arranged to have a resonance frequency equal to the frequency f2 of the above-mentioned alternating-current signal for the erasure instruction detection, and the alternating-current signal having the frequency f2 is received from the position detection device 13, and is returned to the position detection sensor 12. In this case, as is the case with the resonance frequency of the resonant circuit of the electronic pen body circuit 21, the resonance frequency of the resonant circuit of the eraser function circuit 22 is arranged to be a frequency lower than the frequency f2 with an influence of the core body 223 formed by the magnet taken into account so that, when the core body 223 has been inserted through the through hole of the ferrite core 222 to be attached thereto, the resonance frequency of the resonant circuit of the eraser function circuit 22 will be equal to the frequency of the alternating-current signal for the erasure instruction detection from the position detection device 13.

When the user has caused the core body 223 of the eraser function circuit 22 of the electronic pen 2 to be in proximity to or in contact with the front surface of the magnetic sheet 11, the alternating-current signal for the erasure instruction detection transmitted from the position detection device 13 causes an alternating-current signal having the frequency f2 to be returned through the resonant circuit of the eraser function circuit 22, and the position detection device 13 receives the return signal through the position detection sensor 12, and detects a position on the position detection sensor 12 at which the return signal has been received, thereby detecting a coordinate position for which an erasure instruction has been given.

Thus, the handwriting input apparatus according to this embodiment makes it possible to display a writing mark on the front surface of the magnetic sheet 11 by bringing the pen point portion 213a of the electronic pen body circuit 21 of the electronic pen 2 into proximity to or contact with the handwriting input surface 1A, and to detect and store electronic data (writing data and pen pressure data) as to the writing mark.

In addition, the handwriting input apparatus according to this embodiment makes it possible to erase a writing mark displayed on the front surface of the magnetic sheet 11, and delete and erase corresponding writing data and pen pressure data from the storage device, by bringing the distal end portion of the core body 223 of the eraser function circuit 22 of the electronic pen 2 into proximity to or contact with the handwriting input surface 1A and causing the distal end portion to move so as to follow the writing mark displayed on the front surface of the magnetic sheet 11.

Note that, in the case where a writing mark displayed on the magnetic sheet 11 has been erased using the eraser 3 for the magnetic sheet 11, corresponding writing data and pen pressure data stored in the position detection device 13 are not deleted.

In this embodiment, the eraser function circuit 22 of the electronic pen 2 is not provided with a pen pressure detection circuit. However, needless to say, the eraser function circuit 22 may also be provided with a pen pressure detection circuit as is the electronic pen body circuit 21.

As illustrated in FIG. 4B, when the electronic pen 2 according to this embodiment is used, when the pen point portion 213a of the core body 213 of the electronic pen body circuit 21 protrudes outwardly, not only the core body 213 but also a portion of the ferrite core 212 protrudes from the opening 20a of the casing 20, resulting in a reduced distance between a distal end of the tapered portion 212b of the ferrite core 212 and an input surface of the position detection sensor 12. Therefore, the electronic pen 2 according to this embodiment is able to achieve stronger electromagnetic coupling with the position detection sensor 12 compared to a related-art electronic pen in which the ferrite core 212 remains in the hollow portion of the casing 20. Furthermore, in this embodiment, the tapered portion 212b is defined at a distal end portion of the ferrite core 212, resulting in a reduced cross-sectional area of the ferrite core 212 at the distal end thereof, and this leads to an increased magnetic flux density and stronger electromagnetic coupling with the position detection sensor 12.

Therefore, the electronic pen 2 according to this embodiment is able to achieve strong electromagnetic coupling with the position detection sensor 12 even when the electronic pen 2 is made slimmer, and enables the position detection device 13 to detect the position indicated by the electronic pen 2 with high sensitivity.

In this embodiment, the core body 223 and the ferrite core 222 of the eraser function circuit 22 have configurations similar to those of the core body 213 and the ferrite core 212, respectively, of the electronic pen body circuit 21.

Configuration Examples of Electronic Circuits of Handwriting Input Apparatus

Figure 7:
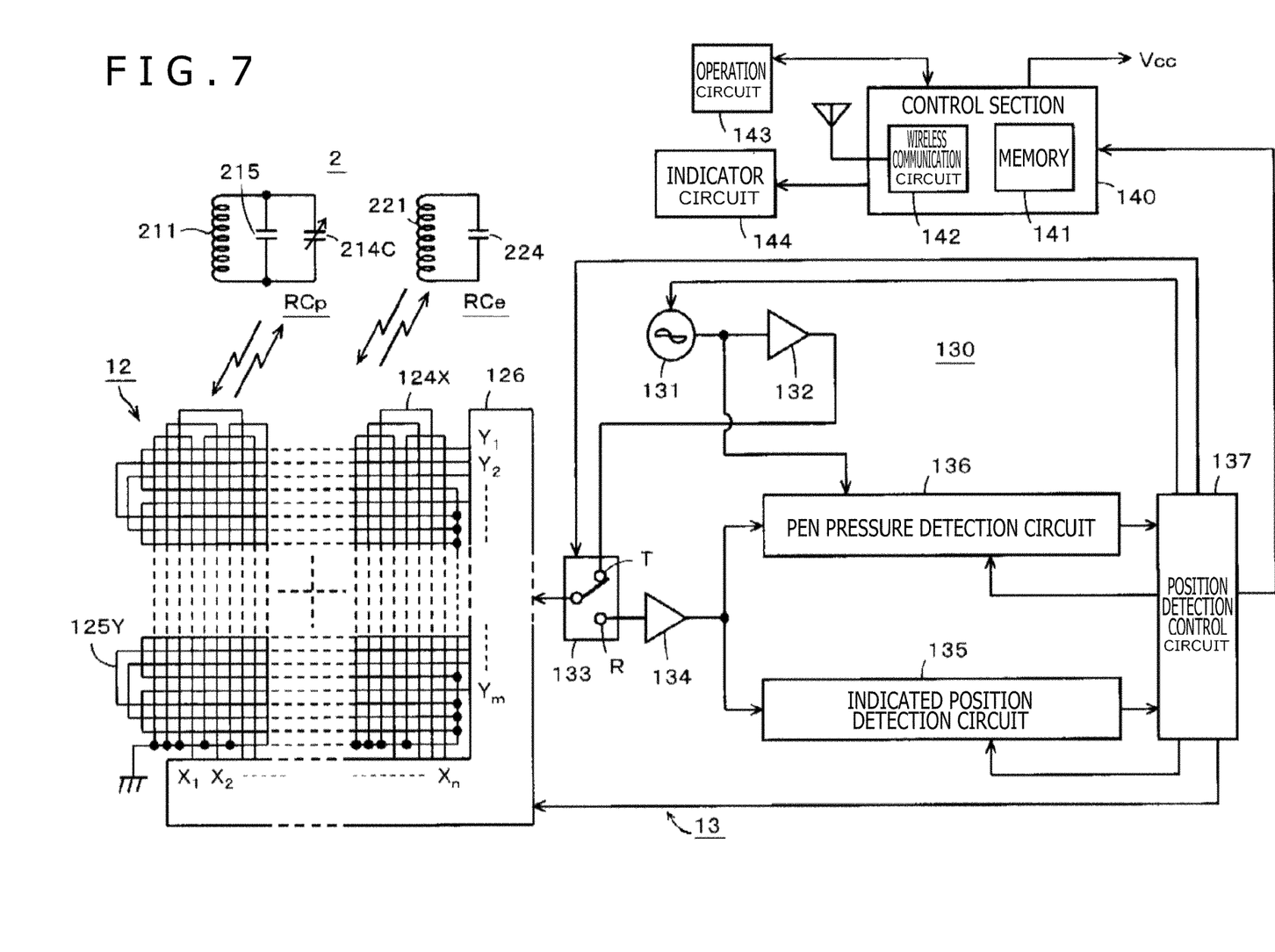
FIG. 7 is a block diagram illustrating a configuration example of electronic circuits of the handwriting input apparatus according to an embodiment of this disclosure.

FIG. 7 is a diagram illustrating the electronic circuit configurations of the tablet terminal 1 and the electronic pen 2 of the handwriting input apparatus according to this embodiment.

As illustrated in FIG. 7, the electronic pen 2 includes a resonant circuit RCp of the electronic pen body circuit 21, and a resonant circuit RCe of the eraser function circuit 22. The resonant circuit RCp includes the coil 211, the capacitor 215, and a variable capacitor 214C formed by the pen pressure detection circuit 214. The resonant circuit RCe includes the coil 221 and the capacitor 224.

When the pen point portion 213a of the core body 213 of the electronic pen body circuit 21 of the electronic pen 2 is brought into proximity to or contact with the handwriting input surface 1A of the tablet terminal 1, the resonant circuit RCp is coupled to the position detection sensor 12 through electromagnetic inductive coupling to exchange the alternating-current signal having the frequency f0 with the position detection sensor 12. Meanwhile, when the distal end portion of the core body 223 of the eraser function circuit 22 of the electronic pen 2 is brought into proximity to or contact with the handwriting input surface 1A of the tablet terminal 1, the resonant circuit RCe is coupled to the position detection sensor 12 through electromagnetic inductive coupling to exchange the alternating-current signal having the frequency f2 with the position detection sensor 12.

An x-axis direction loop coil group 124X and a y-axis direction loop coil group 125Y are formed in the position detection sensor 12 of the position detection device circuit 13. A position detection circuit 130 of the position detection device circuit 13 transmits signals to the resonant circuit RCp and the resonant circuit RCe of the electronic pen 2 through electromagnetic coupling through the x-axis direction loop coil group 124X and the y-axis direction loop coil group 125Y of the position detection sensor 12.

In this case, the position detection circuit 130 is configured to perform a writing input detection process and an erasure input detection process in a time-division manner. Specifically, the position detection circuit 130 alternately carries out a writing input detection period TP in which the writing input detection process is performed, and an erasure input detection period TE in which the erasure input detection process is performed. The position detection circuit 130 transmits the alternating-current signal having the frequency f0 to the electronic pen 2 through the position detection sensor 12 in the writing input detection period TP, and transmits the alternating-current signal having the frequency f2 to the electronic pen 2 through the position detection sensor 12 in the erasure input detection period TE.

Then, when the pen point portion 213a of the core body 213 of the electronic pen body circuit 21 of the electronic pen 2 has been brought into proximity to or contact with the handwriting input surface 1A of the tablet terminal 1, the resonant circuit RCp receives the alternating-current signal having the frequency f0 from the position detection sensor 12 in the writing input detection period TP, and returns the alternating-current signal from the resonant circuit RCp to the position detection sensor 12. Here, the frequency f2 in the erasure input detection period TE is different from the resonance frequency f0 of the resonant circuit RCp, making the reception level of the signal having the frequency f2 low for the resonant circuit RCp, and therefore, the level of the signal returned to the position detection sensor 12 is made too low for the signal to be detected by the position detection circuit 130. Thus, when the pen point portion 213a of the core body 213 of the electronic pen body 21 of the electronic pen 2 is in proximity to or in contact with the handwriting input surface 1A of the tablet terminal 1, the position detection circuit 130 performs only detection of writing input in the writing input detection period TP, and does not perform the erasure input detection process in the erasure input detection period TE.

Meanwhile, when the distal end portion of the core body 223 of the eraser function circuit 22 of the electronic pen 2 has been brought into proximity to or contact with the handwriting input surface 1A of the tablet terminal 1, the resonant circuit RCe receives the alternating-current signal having the frequency f2 from the position detection sensor 12 in the erasure input detection period TE, and returns the alternating-current signal from the resonant circuit RCe to the position detection sensor 12. Here, the frequency f0 in the writing input detection period TP is different from the resonance frequency f2 of the resonant circuit RCe, making the reception level of the signal having the frequency f0 low for the resonant circuit RCe, and therefore, the level of the signal returned to the position detection sensor 12 is made too low for the signal to be detected by the position detection circuit 130. Thus, when the distal end portion of the core body 223 of the eraser function circuit 22 of the electronic pen 2 is in proximity to or in contact with the handwriting input surface 1A of the tablet terminal 1, the position detection circuit 130 performs only detection of erasure input in the erasure input detection period TE, and does not perform the writing input detection process in the writing input detection period TP.

Then, in the position detection circuit 130, the return signal from the resonant circuit RCp or the resonant circuit RCe of the electronic pen 2 is received through electromagnetic coupling via the position detection sensor 12. Then, the position detection circuit 130 detects the position on the position detection sensor 12 indicated by the electronic pen 2 from the position on the position detection sensor 12 at which the received signal has been detected.

In addition, the position detection circuit 130 is configured to detect a change in the resonance frequency of the resonant circuit RCp by detecting a change in phase of the signal received from the electronic pen 2 in the writing input detection period TP, thereby detecting the pen pressure applied to the core body 213 of the electronic pen body circuit 21 of the electronic pen 2.

The position detection circuit 130 is provided with a position detection control circuit 137 that controls time-division processing of the writing input detection process and the erasure input detection process, and controls a position detection process and a pen pressure detection process as described below. In one or more embodiments, the position detection control circuit 137 includes a microprocessor with a processor and a memory storing instructions that, when executed by the processor, cause the position detection control circuit 137 to perform the functions of the position detection control circuit 137 described herein. The position detection control circuit 137 changes an oscillation frequency of an oscillator 131 to the frequency f0 in the writing input detection period TP, and to the frequency f2 in the erasure input detection period TE. Then, in this example, control is performed such that the same detection process is performed in both the writing input detection period TP and the erasure input detection period TE except that the pen pressure detection process is not performed in the erasure input detection period TE.

The position detection circuit 130 is provided with a selection circuit 126 to which the x-axis direction loop coil group 124X and the y-axis direction loop coil group 125Y of the position detection sensor 12 are connected. The selection circuit 126 selects one loop coil after another from among the two loop coil groups 124X and 125Y, and causes the loop coils to transmit signals to the resonant circuit RCp or the resonant circuit RCe, and receive signals returned from the resonant circuit RCp or the resonant circuit RCe.

A switch circuit 133, which is controlled by the position detection control circuit 137 to perform switching, is connected to the selection circuit 126. When the switch circuit 133 is connected to a transmission-side terminal T, an alternating-current signal is supplied from the oscillator 131 to the selection circuit 126, while when the switch circuit 133 is connected to a reception-side terminal R, signals from the selection circuit 126 are supplied to an indicated position detection circuit 135 and a pen pressure detection circuit 136 via an amplifier 134.

The indicated position detection circuit 135 detects induced voltages, i.e., reception signals, generated in the loop coils of the position detection sensor 12, converts the detected output signals to digital signals, and outputs the digital signals to the position detection control circuit 137. The position detection control circuit 137 calculates coordinate values of the position indicated by the electronic pen 2 in the x-axis direction and the y-axis direction on the basis of the digital signals from the indicated position detection circuit 135, i.e., the level of the voltage value of the induced voltage generated in each loop coil.

Meanwhile, the pen pressure detection circuit 136 performs synchronous detection of the signal outputted from the amplifier 134 using an alternating-current signal from the oscillator 131, obtains a signal having a level corresponding to a phase difference (frequency shift) therebetween, converts the signal corresponding to the phase difference (frequency shift) to a digital signal, and outputs the digital signal to the position detection control circuit 137. The position detection control circuit 137 detects the pen pressure applied to the core body 213 of the electronic pen body circuit 21 of the electronic pen 2 on the basis of the digital signal from the pen pressure detection circuit 136, i.e., the level of the signal corresponding to the phase difference (frequency shift) between a transmitted radio wave and a received radio wave.

In the writing input detection period TP, the position detection control circuit 137 supplies, as the writing data, coordinate data as to the detected position indicated by the electronic pen 2 to a control circuit 140 together with the detected pen pressure data. Meanwhile, in the erasure input detection period TE, the position detection control circuit 137 supplies, as erasure data, coordinate data as to the detected position indicated by the electronic pen 2 to the control circuit 140. In one or more embodiments, the control circuit 140 includes a microprocessor with a processor and a memory storing instructions that, when executed by the processor, cause the control circuit 140 to perform the functions of the control circuit 140 described herein.

The control circuit 140 includes a memory 141 and a wireless communication circuit 142. The control circuit 140 further includes a rechargeable battery, a charging circuit, and a power supply circuit, which are not illustrated in the figures. In addition, an operation circuit 143 including the power button 1Ba, the writing input end button 1Bb, and the information transmission button 1Bc provided in the operation panel circuit 1B, and an indicator circuit 144 including the power indicator 1Bd and the communication indicator 1Be are connected to the control circuit 140.

When the power button 1Ba of the operation circuit 143 has been pressed for power-on, the control circuit 140 generates a power supply voltage Vcc and supplies the power supply voltage Vcc to various parts, thus causing the tablet terminal 1 to enter an operating state. At this time, the control circuit 140 turns on the power indicator 1Bd, thus informing the user of the power-on. If the power button 1Ba is pressed again, this means an instruction for power-off, and the control circuit 140 stops the supply of the power supply voltage Vcc to the various parts, resulting in a non-operating state, and the power indicator 1Bd is turned off.

The control circuit 140 stores the writing data and the pen pressure data received from the position detection control circuit 137 in the memory 141. In addition, if the control circuit 140 receives the erasure data from the position detection control circuit 137, the control circuit 140 deletes corresponding writing data and pen pressure data stored in the memory 141.

In addition, if the control circuit 140 detects a pressing of the writing input end button 1Bb by the user, the control circuit 140 causes a group made up of the writing data and pen pressure data stored in the memory 141 up to that time to be stored as one-page data. At this time, page identification information is assigned to the one-page data.

Therefore, after pressing the writing input end button 1Bb, the user can erase any writing mark appearing on the whole front surface of the magnetic sheet 11 using the eraser 3, thereby enabling a new handwriting input. Here, because the eraser 3 is designed to erase only the writing mark appearing on the front surface of the magnetic sheet 11, the control circuit 140 does not delete the writing data, which is generated on a page-by-page basis, stored in the memory 141.

If the user makes a new writing input and an erasure using the electronic pen 2 after erasing all writing marks appearing on the front surface of the magnetic sheet 11 as described above, the control circuit 140 stores writing data and pen pressure data as to the new writing input in the memory 141. Then, if the user presses the writing input end button 1Bb, the writing data and the pen pressure data newly stored in the memory 141 are stored as data of another page in the memory 141.

In addition, in this embodiment, the control circuit 140 includes the wireless communication circuit 142, and is capable of performing wireless communication with a server apparatus formed by a computer, for example. Then, if the user presses the information transmission button 1Bc of the operation panel 1B of the tablet terminal 1 in an environment in which the wireless communication with the server apparatus is possible, the control circuit 140 transmits the writing data and the pen pressure data, which are generated on a page-by-page basis, stored in the memory 141 to the server apparatus, and erases the memory 141. Here, while the writing data and the pen pressure data are being transmitted to the server apparatus, the control circuit 140 informs the user of the fact that the writing data and the pen pressure data are being transmitted to the server apparatus by turning on the communication indicator 1Be.

Note that the control circuit 140 may be configured to automatically transmit the writing data and the pen pressure data, which are generated on a page-by-page basis, to the server apparatus once the writing input end button is pressed, instead of transmitting the writing data and the pen pressure data, which are generated on a page-by-page basis, stored in the memory 141 to the server apparatus when the information transmission button 1Bc has been pressed by the user. In this case, the information transmission button does not need to be provided.

<Mode of Use of Handwriting Input Apparatus by User>

An example flow of a mode of use of the handwriting input apparatus according to this embodiment, which has the above-described configuration, by the user will now be described below.

At the beginning of this description, it is assumed that no writing mark exists on the handwriting input surface 1A on the front surface of the magnetic sheet 11 of the tablet terminal 1. In this situation, the user turns on the power of the tablet terminal 1 by pressing the power button 1Ba of the tablet terminal 1 for power-on.

Then, the user holds the electronic pen 2, and brings the pen point portion 213a of the core body 213 of the electronic pen body circuit 21 into proximity to or contact with the handwriting input surface 1A to make a writing input. As a result, since the core body 213 is formed by the magnet, the iron particles inside the microcapsules 113 that lie at the position at which the core body 213 is in proximity to or in contact with the handwriting input surface 1A are attracted toward the core body 213, so that a writing mark made therewith is colored black, for example, to be visually recognizable for the user on the front surface of the magnetic sheet 11.

At the same time, in the tablet terminal 1, the position detection sensor 12 disposed on the rear side of the magnetic sheet 11 is coupled to the coil 211 of the resonant circuit RCp of the electronic pen body circuit 21 of the electronic pen 2 through electromagnetic inductive coupling, and writing data and pen pressure data corresponding to the writing mark appearing on the front surface of the magnetic sheet 11 are detected in the position detection device circuit 13, and are stored in the memory 141 of the control circuit 140.

When the user desires to erase the inputted writing mark during this writing input, the user holds the electronic pen 2 upside down, and brings the distal end portion of the core body 223 of the eraser function circuit 22 into proximity to or contact with a position of the writing mark that is to be erased on the front surface of the magnetic sheet 11 of the tablet terminal 1. As a result, the portion of the writing mark appearing on the front surface of the magnetic sheet 11 returns to the original color of the magnetic sheet 11 due to the core body 223 formed by the magnet, and is thus erased. At the same time, the coil 221 of the resonant circuit RCe of the eraser function circuit 22 of the electronic pen 2 is coupled to the position detection sensor 12 through electromagnetic inductive coupling, and erasure data as to the writing mark appearing on the front surface of the magnetic sheet 11 is detected in the position detection device circuit 13, and is supplied to the control circuit 140. The control circuit 140 receives this erasure data, and deletes the writing data and pen pressure data corresponding to the erasure data from the memory 141.

Then, the user presses the writing input end button 1Bb of the operation panel circuit 1B of the tablet terminal 1 when the user has determined to end a writing input for one page while viewing the writing mark appearing on the front surface of the magnetic sheet 11. As a result, in the tablet terminal 1, the writing data and pen pressure data stored in the memory 141 up to that time are stored as one-page data, with the page identification information added thereto, in the memory 141 as described above.

Next, when the user desires to make a writing input for another page, the user erases the writing mark appearing on the front surface of the magnetic sheet 11 using the eraser 3. Then, the user brings the pen point portion 213a of the core body 213 of the electronic pen body circuit 21 of the electronic pen 2 into proximity to or contact with the handwriting input surface 1A to make a writing input. Then, the user presses the writing input end button 1Bb when it is determined that a writing input for one page has been finished. As a result, writing data and pen pressure data for a new page, with identification information different from the identification information for the previously stored one-page data assigned thereto, are stored in the memory 141.

Note that writing data and pen pressure data generated after the writing input end button 1Bb is pressed are stored, as writing data and pen pressure data for a new page, in the memory 141, even if an erasure is not performed using the eraser 3.

As described above, with use of the tablet terminal 1 and the electronic pen 2, writing data and pen pressure data for one or more pages can be stored in the memory 141 of the tablet terminal 1. The user may take the tablet terminal 1 home or to a workplace, connect the tablet terminal 1 to a computer set to be capable of communicating with the wireless communication circuit 142 in a wireless manner, and press the information transmission button 1Bc. As a result, the tablet terminal 1 transmits the writing data and pen pressure data for one or more pages stored in the memory 141 to the computer in a wireless manner. Then, after the wireless transmission is completed, the data stored in the memory 141 is deleted in the tablet terminal 1.

Accordingly, the tablet terminal 1 is thereafter in a state of being capable of accepting a new writing input and repeating the above-described operation.

Note that the electronic pen 2 may be provided with a storage device for pen identification information for identifying the electronic pen 2, and that the pen identification information in this storage may be transmitted to the position detection device circuit 13 through electromagnetic inductive coupling with the position detection sensor 12 or through wireless communication means additionally provided so that the writing data and the pen pressure data can be stored in the position detection device circuit 13 together with the page identification information and the pen identification information.

Advantageous Effects

According to the handwriting input apparatus of the above-described embodiment, electronic data as to the writing input made up of the writing data and the pen pressure data can be obtained as in related art by making the writing input on the handwriting input surface 1A using the electronic pen 2 including the core body formed by the magnet, and the need for a display panel, such as an LCD, can be eliminated by using the magnetic sheet 11 capable of expressing a writing mark through the magnet, which leads to a reduced production cost.

In addition, the use of the magnetic sheet 11, which allows the writing mark to be easily erased using the eraser 3 or the eraser function circuit 22 of the electronic pen 2, eliminates the need to use paper as in JP 2018-37033A, thus providing increased portability, and provides an additional advantage in that eraser dust is not produced in contrast to the case where paper is used.

Furthermore, the electronic pen 2 of the handwriting input apparatus according to this embodiment may have a configuration similar to that of a known electronic pen of the electromagnetic induction type except that the core body is formed by the magnet, and can therefore be produced at a low cost, which is another advantage.

Furthermore, a known position detection circuit and a known position detection sensor of the electromagnetic induction type as they can be used as the position detection circuit 130 and the position detection sensor 12, respectively, of the position detection device circuit 13 of the handwriting input apparatus according to the above-described embodiment, and this provides an additional advantage in terms of cost.

[Modifications of Core Body]

While each of the core body 213 and the core body 223 is formed by the bar-shaped magnet alone in the above-described embodiment, this is not essential to this disclosure.

First Example of Other Configuration Examples of Core Body

Figures 8A, 8B, 8C:
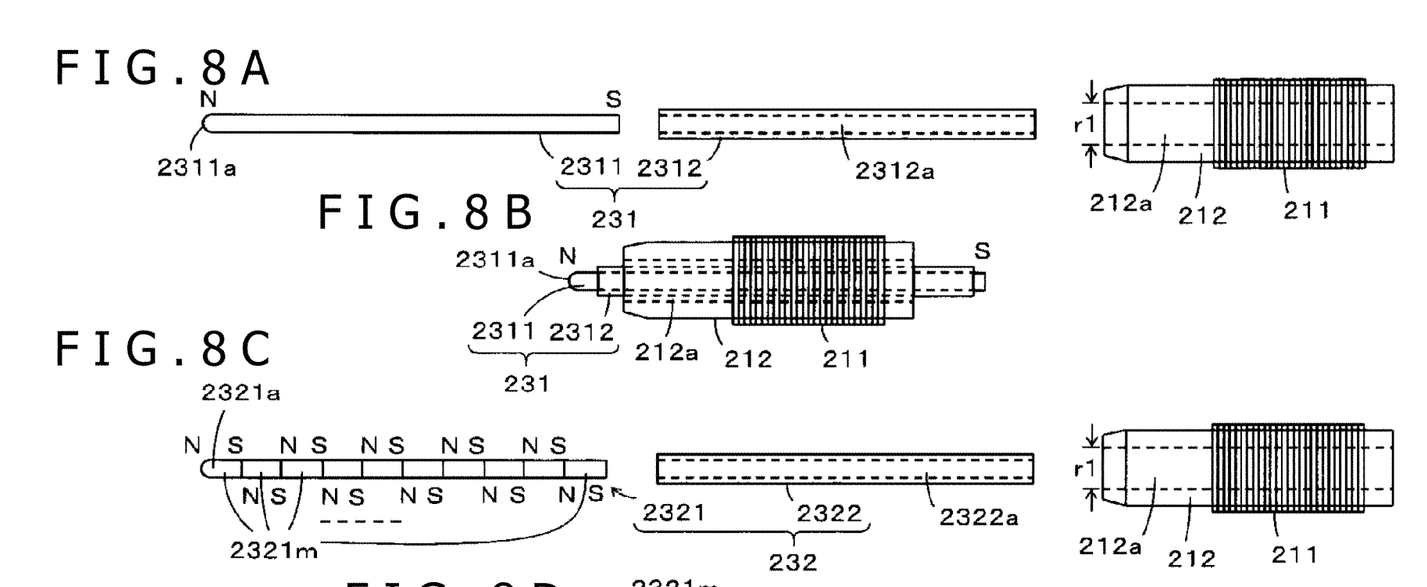
FIGS. 8A, 8B, 8C, 8D, and 8E are diagrams for explaining other configuration examples of a core body of the electronic pen that forms a part of the handwriting input apparatus according to an embodiment of this disclosure.

FIGS. 8A and 8B are diagrams for explaining a first example of the modification of the core body of the electronic pen body circuit 21. FIG. 8A is an exploded view of a core body 231 according to the first example and the ferrite core 212 around which the coil 211 is wound, while FIG. 8B illustrates a state in which the core body 231 according to the first example is inserted through the through hole 212a of the ferrite core 212 around which the coil 211 is wound.

As illustrated in FIGS. 8A and 8B, the core body 231 according to the first example is formed by a bar-shaped magnet member 2311 and a pipe member 2312 made of a hard material, e.g., a metal or a hard resin. In this example, the bar-shaped magnet member 2311 has a north pole at an end portion 2311a on one side in the axial direction, which forms a pen point portion, and a south pole on the opposite side as in the core body 213, and has an outside diameter smaller than the outside diameter of the core body 213.

The pipe member 2312 is arranged to have an outside diameter smaller than the diameter r1 of the through hole 212a of the ferrite core 212 around which the coil 211 is wound. In addition, the pipe member 2312 is arranged to have an inside diameter slightly smaller than the outside diameter of the bar-shaped magnet member 2311. Then, as illustrated in FIG. 8B, the bar-shaped magnet member 2311 is press fitted and inserted into a hollow portion 2312a of the pipe member 2312 to form the core body 231 having the magnet member 2311 and the pipe member 2312 as a unitary body. In this case, the magnet member 2311 and the pipe member 2312 may be adhered to each other through an adhesive.

In this case, the pipe member 2312 is arranged to have an axial length smaller than the axial length of the magnet member 2311, and the core body 231 is formed in such a manner that the end portion 2311a of the magnet member 2311 on the one side in the axial direction protrudes, as the pen point portion, from an end portion of the pipe member 2312 on the one side in the axial direction. In addition, in the first example, an end portion of the magnet member 2311 on the opposite side in the axial direction is arranged to protrude from an end portion of the pipe member 2312 on the opposite side in the axial direction. Note that the end portion of the magnet member 2311 on the opposite side in the axial direction may not protrude from the end portion of the pipe member 2312 on the opposite side in the axial direction.

In addition, as illustrated in FIG. 8B, the end portion 2311a, which forms the pen point portion, of the magnet member 2311 of the core body 231 on the one side is arranged to protrude from the end portion of the ferrite core 212 on the pen-point side together with a portion of the pipe member 2312. Thus, the magnetic pole at the end portion 2311a, which forms the pen point portion, of the magnet member 2311 of the core body 231 on the one side is located away from the end portion of the ferrite core 212 on the pen-point side.

When used in the electronic pen 2 involving use of a core body formed by a magnet, the core body 231 according to the first example is able to produce advantageous effects similar to those of the above-described embodiment. In particular, the core body 231 according to the first example is formed by inserting the bar-shaped magnet member 2311 into the hollow portion 2312a of the pipe member 2312, which has a high rigidity, and is therefore able to easily ensure necessary and sufficient rigidity as a core body due to protection by the pipe member 2312 even when the bar-shaped magnet member 2311 is thin.

Second Example of Other Configuration Examples of Core Body

Figures 8D, 8E:
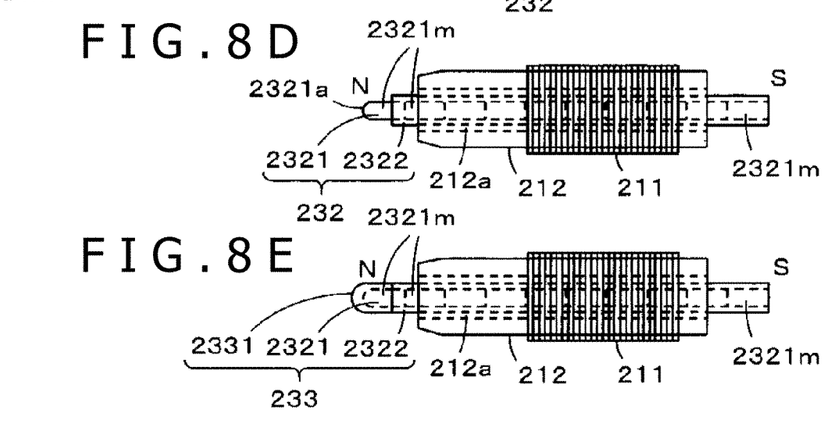

FIGS. 8C and 8D are diagrams for explaining a second example of the modification of the core body of the electronic pen body circuit 21. FIG. 8C is an exploded view of a core body 232 according to the second example and the ferrite core 212 around which the coil 211 is wound, while FIG. 8D illustrates a state in which the core body 232 according to the second example is inserted through the through hole 212a of the ferrite core 212 around which the coil 211 is wound.

As illustrated in FIGS. 8C and 8D, the core body 232 according to the second example is formed by a bar-shaped magnet member 2321, which is formed by a plurality of magnet elements 2321m arranged in a line in the axial direction and joined together, and a pipe member 2322. The pipe member 2322 is made of a hard material, e.g., a metal or a hard resin, as is the pipe member 2312 of the core body 231 according to the first example, and is arranged to have the same outside diameter, inside diameter, and length as those of the pipe member 2312 of the core body 231 according to the first example.

The magnet elements 2321m correspond to the magnet member 2311 of the core body 231 according to the first example cut perpendicularly to an axis thereof into columnar slices. In addition, as illustrated in FIG. 8D, the core body 232 according to the second example is formed by press fitting the magnet member 2321, which is formed by the plurality of magnet elements 2321m each in the shape of a round column arranged in a line and joined together, into a hollow portion 2322a of the pipe member 2322. In this case, the magnet elements 2321m each in the shape of a round column may be press fitted into the hollow portion 2322a of the pipe member 2322 sequentially and be joined together to form the core body 232. Note that an adhesive may be used to adhere adjacent ones of the magnet elements 2321m to each other, and to adhere each magnet element 2321m to the pipe member 2322.

In the core body 232 according to the second example, an end portion 2321a of the magnet member 2321 on one side in the axial direction protrudes, as a pen point portion, from an end portion of the pipe member 2322 on the one side in the axial direction. Note that an end portion of the magnet member 2321 on an opposite side in the axial direction may or may not protrude from an end portion of the pipe member 2322 on the opposite side in the axial direction.

In addition, as illustrated in FIG. 8D, the end portion 2321a, which forms the pen point portion of the core body 232, is arranged to protrude from the end portion of the ferrite core 212 on the pen-point side together with a portion of the pipe member 2322. Thus, a magnetic pole at the end portion 2321a, which forms the pen point portion, of the magnet member 2321 of the core body 232 on the one side is located away from the end portion of the ferrite core 212 on the pen-point side.

When used in the electronic pen 2 involving use of a core body formed by a magnet, the core body 232 according to the second example is also able to produce advantageous effects similar to those of the above-described embodiment. Moreover, particularly because the core body 232 according to the second example is formed by the plurality of magnet elements 2321m arranged in a line and joined together, the core body 232 according to the second example is able to produce an advantageous effect of improved shock resistance against an impact load applied to the end portion 2321a, which forms the pen point portion, of the magnet member 2321 of the core body 232 on the one side.

Third Example of Other Configuration Examples of Core Body

FIG. 8E is a diagram for explaining a third example of the modification of the core body of the electronic pen body circuit 21. In the core bodies 231 and 232 according to the above-described first and second examples, the end portions 2311a and 2321a, which form the pen point portions, of the magnet members 2311 and 2321 on the one side are exposed outward, whereas, in a core body according to the third example, an end portion, which forms a pen point portion, of a bar-shaped magnetic member on one side is covered with a protective member.

FIG. 8E illustrates a state in which a core body 233 according to the third example is inserted through the through hole 212a of the ferrite core 212 around which the coil 211 is wound. The core body 233 according to this example corresponds to the core body 232 according to the above-described second example with the end portion 2321a, which forms the pen point portion, of the magnet member 2321 on the one side being covered with a protective cap 2331. In FIG. 8E, portions of the core body 233 which have their equivalents in the core body 232 according to the second example are denoted by the same reference characters as those of their equivalents in the core body 232.

In this example, the protective cap 2331 is made of, for example, a resin regardless of the material of the pipe member 2322. The protective cap 2331 may be made of a metal in the case where the pipe member 2322 is made of a metal.

In addition, the protective cap 2331 may be formed at an end of the pipe member 2322 so as to be integral with the pipe member 2322. That is, the core body 233 may be formed by preparing a bar-shaped member having an internal hollow portion and having a closed end on the side on which the end portion 2321a of the magnet member 2321 of the core body 232 on the one side is to be disposed, and inserting the magnet member 2321 into the bar-shaped member through an opening of the bar-shaped member on the side opposite to the pen-point side.

According to the core body 233 of the third example, the protective cap 2331 serves to prevent the pen point portion of the core body formed by the magnet from chipping, and friction can be reduced when the pen point portion of the core body is in contact with the handwriting input surface.

Note that, although FIG. 8E illustrates the case where the end portion 2321a, which forms the pen point portion, of the magnet member 2321 of the core body 232 according to the second example is covered with the protective member, the third example is also applicable to the case where the end portion 2311a, which forms the pen point portion, of the magnet member 2311 of the core body 231 according to the first example is covered with a protective member.

Note that, needless to say, the above-described first to third examples are applicable to the core body of the eraser function circuit 22 in the same manners as to the core body of the electronic pen body circuit 21.

OTHER EMBODIMENTS OR MODIFICATIONS

Although, in the electronic pen 2 according to the above-described embodiment, the end portion of the ferrite core 212 on the pen-point side is also arranged to protrude outwardly from the opening 20a of the casing 20 of the electronic pen 2, only the pen point portion 213a of the core body 213 may be arranged to protrude outwardly from the opening 20a, with the ferrite core 212 lying within the hollow portion of the casing 20. The same applies to the eraser function circuit 22.

Note that, although the electronic pen 2 according to the above-described embodiment is configured to include the eraser function circuit 22 in addition to the electronic pen body circuit 21, the eraser function circuit 22 may be formed as a member separate from the electronic pen 2.

Also note that, although the tail portion of the core body 213 is directly fitted to the fitting recessed portion 214a of the pen pressure detection circuit 214 in the above-described embodiment, the core body 213 may be indirectly fitted to the pen pressure detection with a pen pressure transmission member intervening between the tail portion and the fitting recessed portion 214a.

It is to be noted that the embodiments of the present disclosure are not limited to the foregoing embodiments, and that various changes can be made without departing from the spirit of the present disclosure.

What is claimed is:

1. An electronic pen comprising:
a casing having a plurality of openings;
a first coil;
a first magnetic core having the first coil wound therearound, and having a through hole extending in an axial direction of the electronic pen;
a first capacitor that forms a first resonant circuit together with the first coil; and
a first core body inserted through the through hole of the first magnetic core,
wherein the electronic pen, in operation, exchanges a signal having a frequency corresponding to a first resonance frequency of the first resonant circuit with a position detection sensor through electromagnetic inductive coupling,
wherein the first core body includes a pen point portion and a tail portion forming magnetic poles on opposite sides of the first core body, and the pen point portion protrudes outwardly from one of the openings of the casing of the electronic pen and is located away from an end of the first magnetic core on a side of the electronic pen that includes the pen point portion in the axial direction of the electronic pen, and
wherein the first resonant circuit is arranged such that the first resonance frequency is adjusted to a predetermined frequency of a signal transmitted from a position detection device with an influence of magnetic flux due to the magnetic poles of the first core body.

2. The electronic pen according to claim 1, further comprising:
a pen pressure detection circuit disposed inside the casing, and having the tail portion of the first core body coupled thereto.

3. The electronic pen according to claim 1, wherein the first core body is formed by a bar-shaped magnet.

4. The electronic pen according to claim 1, wherein the first core body is formed by a plurality of magnets arranged in a line in the axial direction of the electronic pen and joined together.

5. The electronic pen according to claim 1, wherein the first core body is formed by a pipe made of a metal and having a hollow portion, and a magnet housed in the hollow portion.

6. The electronic pen according to claim 1, wherein the first core body is formed by a pipe made of a resin and having a hollow portion, and a magnet housed in the hollow portion.

7. The electronic pen according to claim 1, wherein the first core body has a protective member covering a distal end portion of the first core body on the side of the electronic pen that includes the pen point portion of the first core body.

8. The electronic pen according to claim 1, further comprising:
an eraser function circuit disposed on a side opposite to the side of the electronic pen that includes the pen point portion of the first core body in the casing, the eraser function circuit including:
a second coil different from the first coil,
a second magnetic core having the second coil wound therearound, and having a through hole extending in the axial direction of the electronic pen,
a second capacitor that forms a second resonant circuit together with the second coil, the second resonant circuit having a second resonance frequency different from the first resonance frequency of the first resonant circuit, and
a second core body including a distal end portion and a tail portion forming magnetic poles on opposite sides of the second core body, and inserted through the through hole of the second magnetic core,
wherein the distal end portion of the second core body protrudes outwardly from one of the openings of the casing on the side opposite to the side of the electronic pen that includes the pen point portion of the first core body.

9. A handwriting input apparatus comprising:
a position detection device having a position detection sensor of an electromagnetic induction type disposed under a magnetic sheet that changes a color at a position at which a magnetic pole is in proximity to or in contact with the magnetic sheet so as to overlap with the magnetic sheet; and
an electronic pen including:
a casing having a plurality of openings,
a first coil,
a first magnetic core having the first coil wound therearound, and having a through hole extending in an axial direction of the electronic pen,
a first capacitor that forms a first resonant circuit together with the first coil, and
a first core body inserted through the through hole of the first magnetic core,
wherein the first core body includes a pen point portion and a tail portion forming magnetic poles on opposite sides of the first core body, and the pen point portion protrudes outwardly from one of the openings of the casing of the electronic pen and is located away from an end of the first magnetic core on a side of the electronic pen that includes the pen point portion in the axial direction of the electronic pen,
wherein the position detection sensor of the position detection device, in operation, exchanges a signal having a frequency corresponding to a first resonance frequency of the first resonant circuit with the first resonant circuit of the electronic pen through electromagnetic inductive coupling,
wherein the position detection device, in operation, transmits a signal having a predetermined frequency to the electronic pen through electromagnetic inductive coupling via the position detection sensor,
wherein the electronic pen, in operation, receives the signal having the predetermined frequency with the first resonant circuit, and returns the signal received with the first resonant circuit to the position detection sensor through electromagnetic inductive coupling, and
wherein the first resonant circuit is arranged such that the first resonance frequency corresponds to the predetermined frequency of the signal transmitted from the position detection device, and the first resonance frequency is adjusted to the predetermined frequency of the signal transmitted from the position detection device with an influence of magnetic flux due to the magnetic poles of the first core body.

10. The handwriting input apparatus according to claim 9, wherein:
the magnetic sheet has a layer including a plurality of microcapsules containing particles made of a magnetic material, and
at a position at which the magnetic pole at the pen point portion of the first core body of the electronic pen is in proximity to or in contact with the magnetic sheet, the particles made of the magnetic material in the layer of the magnetic sheet are magnetically attracted toward the magnetic pole at the pen point portion of the first core body to change a color of a position on a front surface of the magnetic sheet at which the magnetic pole at the pen point portion of the first core body is in proximity to or in contact with the magnetic sheet.

11. The handwriting input apparatus according to claim 10, further comprising:
an erasure which, in operation, returns the particles at which the pen point portion of the first core body has been in proximity to or in contact with the magnetic sheet to original positions in the microcapsules in the layer of the magnetic sheet and erases the color changed on the magnetic sheet.

12. The handwriting input apparatus according to claim 9, wherein:
the electronic pen includes an eraser function circuit disposed on a side opposite to the side of the electronic pen that includes the pen point portion of the first core body in the casing, the eraser function circuit including:
a second coil different from the first coil;
a second magnetic core having the second coil wound therearound, and having a through hole extending in the axial direction of the electronic pen;
a second capacitor that forms a second resonant circuit together with the second coil, the second resonant circuit having a second resonance frequency different from the first resonance frequency of the first resonant circuit; and
a second core body including a distal end portion and a tail portion forming magnetic poles on opposite sides of the second core body, and inserted through the through hole of the second magnetic core,
the distal end portion of the second core body protrudes outwardly from one of the openings of the casing on the side opposite to the side of the electronic pen that includes the pen point portion of the first core body,
the magnetic sheet changes the color that is changed back to an original color at a position at which the second core body of the eraser function circuit is in proximity to or in contact with the magnetic sheet, and,
in the position detection device, coordinate data as to a position at which the second resonance frequency for the second resonance circuit of the eraser function circuit from the electronic pen is detected through the position detection sensor is deleted.

* * * * *